United States Patent
Jensen

(10) Patent No.: US 10,766,503 B2
(45) Date of Patent: Sep. 8, 2020

(54) TRIGGERING SYSTEM FOR SPOTTER CONTROL ON TRAIN

(71) Applicant: Progress Rail Locomotive Inc., LaGrange, IL (US)

(72) Inventor: Jeffrey Edward Jensen, Park Ridge, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 408 days.

(21) Appl. No.: 15/730,164

(22) Filed: Oct. 11, 2017

(65) Prior Publication Data
US 2019/0106127 A1    Apr. 11, 2019

(51) Int. Cl.
| B61C 17/12 | (2006.01) |
| B61L 3/08 | (2006.01) |
| B61L 25/02 | (2006.01) |
| B61L 27/00 | (2006.01) |

(52) U.S. Cl.
CPC ........... *B61C 17/12* (2013.01); *B61L 25/025* (2013.01); *B61L 27/0094* (2013.01); *B61L 2205/04* (2013.01)

(58) Field of Classification Search
CPC ....... B61C 17/12; B61L 25/065; B61L 25/025
See application file for complete search history.

(56) References Cited

U.S. PATENT DOCUMENTS

| 4,955,304 | A | * | 9/1990 | Spenk | B60T 17/228 104/295 |
| 5,065,963 | A | * | 11/1991 | Usui | B61L 3/065 246/184 |
| 6,421,587 | B2 | | 7/2002 | Diana et al. | |
| 6,526,339 | B1 | | 2/2003 | Herzog et al. | |
| 6,928,972 | B2 | * | 8/2005 | Biess | F01M 5/021 123/142.5 R |
| 7,529,201 | B2 | | 5/2009 | Aiken, II et al. | |
| 7,707,944 | B2 | | 5/2010 | Bounds | |
| 7,715,276 | B2 | * | 5/2010 | Agam | B61L 23/041 367/96 |
| 8,380,363 | B2 | | 2/2013 | Ecton et al. | |
| 9,145,863 | B2 | | 9/2015 | Melster et al. | |
| 2013/0006443 | A1 | * | 1/2013 | Woo | B61L 3/127 701/2 |
| 2013/0317674 | A1 | * | 11/2013 | Arai | B60L 15/32 701/19 |
| 2015/0009331 | A1 | * | 1/2015 | Venkatraman | B61L 23/041 348/148 |

(Continued)

*Primary Examiner* — Navid Ziaeianmehdizadeh
*Assistant Examiner* — Tarek Elarabi
(74) *Attorney, Agent, or Firm* — Harrity & Harrity LLP

(57) ABSTRACT

A triggering system for a train having a spotter control system is provided. The triggering system includes a position detection system configured to generate a position signal indicative of a position of a rail shop relative to the train. The system also includes a controller coupled to the position detection system, the spotter control system, and an engine of the train. The controller is configured to receive the position signal from the position detection system. The controller is configured to detect if the train is approaching the rail shop based on the position signal. The controller is configured to trigger a shutdown of the engine based on the detection. The controller is configured to trigger an activation of the spotter control system based on the detection.

20 Claims, 4 Drawing Sheets

(56) References Cited

U.S. PATENT DOCUMENTS

| | | | |
|---|---|---|---|
| 2015/0175180 A1* | 6/2015 | Szprynger | B61L 3/008 701/2 |
| 2016/0129925 A1* | 5/2016 | Jensen | B61L 3/006 701/19 |
| 2017/0305396 A1* | 10/2017 | Shiratsuchi | B60T 7/12 |
| 2018/0223746 A1* | 8/2018 | Mack | B61C 17/12 |

* cited by examiner

TRIGGERING SYSTEM FOR SPOTTER CONTROL ON TRAIN

TECHNICAL FIELD

The present disclosure relates to a triggering system, and more specifically, to the triggering system for spotter control on a train.

BACKGROUND

For conducting maintenance services on a train or locomotive, it may be required to move (or spot) the train within or outside of a railway maintenance facility or shop in many cases, it may be desirable to do this without operating a diesel engine or other power source of the train that is usually used for driving the train. It may be preferable to move the train to the railway shop in another manner.

Spotter control systems are in use that are operated from a cab of the train and drive the train by applying voltage from an alternate source of power, for example, locomotive batteries across at least one of the traction motors of the locomotive, to develop power. Braking is achieved by operation of brake controls present on the train after the brake control has been charged with air pressure.

Generally, the spotter control systems may be manually controlled such that an operator seated in the operator cab may need to activate the spotter control system when the train is approaching or is in the railway shop. This may be a laborious, time consuming process, and may even be prone to human errors due to reliance on the operator. Further, if the spotter control system is activated when the train is in the railway shop, additional lead time may be incurred in the servicing or maintenance activities.

U.S. Pat. No. 6,526,339 (hereinafter referred to as '339 patent) describes a GPS controlled multiple source material application or ballast spreading system. The system includes tracking the position of a plurality of ballast hopper cars using GPS derived coordinates and controlling the opening of multiple ballast doors to spread ballast on desired sections of track for railroad maintenance. The process involves tracking the current hopper loads, the opened or closed state of the ballast doors, and the concurrent amount of ballast which has been spread on the desired track sections.

However, the '339 patent does not provide an effective means for controlling the spotter control system on the train. Hence, there is a need to provide an improved system and method for the control of the spotter control system on the train.

SUMMARY OF THE DISCLOSURE

In one aspect of the present disclosure, a triggering system for a train having a spotter control system is provided. The triggering system includes a position detection system configured to generate a position signal indicative of a position of a rail shop relative to the train. The system also includes a controller coupled to the position detection system, the spotter control system, and an engine of the train. The controller is configured to receive the position signal from the position detection system. The controller is configured to detect if the train is approaching the rail shop based on the position signal. The controller is configured to trigger a shutdown of the engine based on the detection. The controller is configured to trigger an activation of the spotter control system based on the detection.

In another aspect of the present disclosure, a method for triggering a spotter control system associated with a train is provided. The method includes receiving, by a controller, a position signal from a position detection system associated with the train. The position signal is indicative of a position of the train with respect to a rail shop. The method includes detecting, by the controller, if the train is approaching the rail shop based on the position signal. The method includes triggering, by the controller, a shutdown of the engine of the train based on the detection. The method includes triggering, by the controller, an activation of the spotter control system based on the detection.

In yet another aspect of the present disclosure, a train is provided. The train includes an engine, a spotter control system, and a triggering system. The triggering system includes a position detection system configured to generate a position signal indicative of a position of a rail shop relative to the train. The triggering system includes a controller coupled to the position detection system, the spotter control system and the engine. The controller is configured to receive the position signal from the position detection system. The controller is configured to detect if the train is approaching the rail shop based on the position signal. The controller is configured to trigger a shutdown of the engine based on the detection. The controller is configured to trigger an activation of the spotter control system based on the detection.

Other features and aspects of this disclosure will be apparent from the following description and the accompanying drawings.

DETAILED DESCRIPTION

Figure 1:
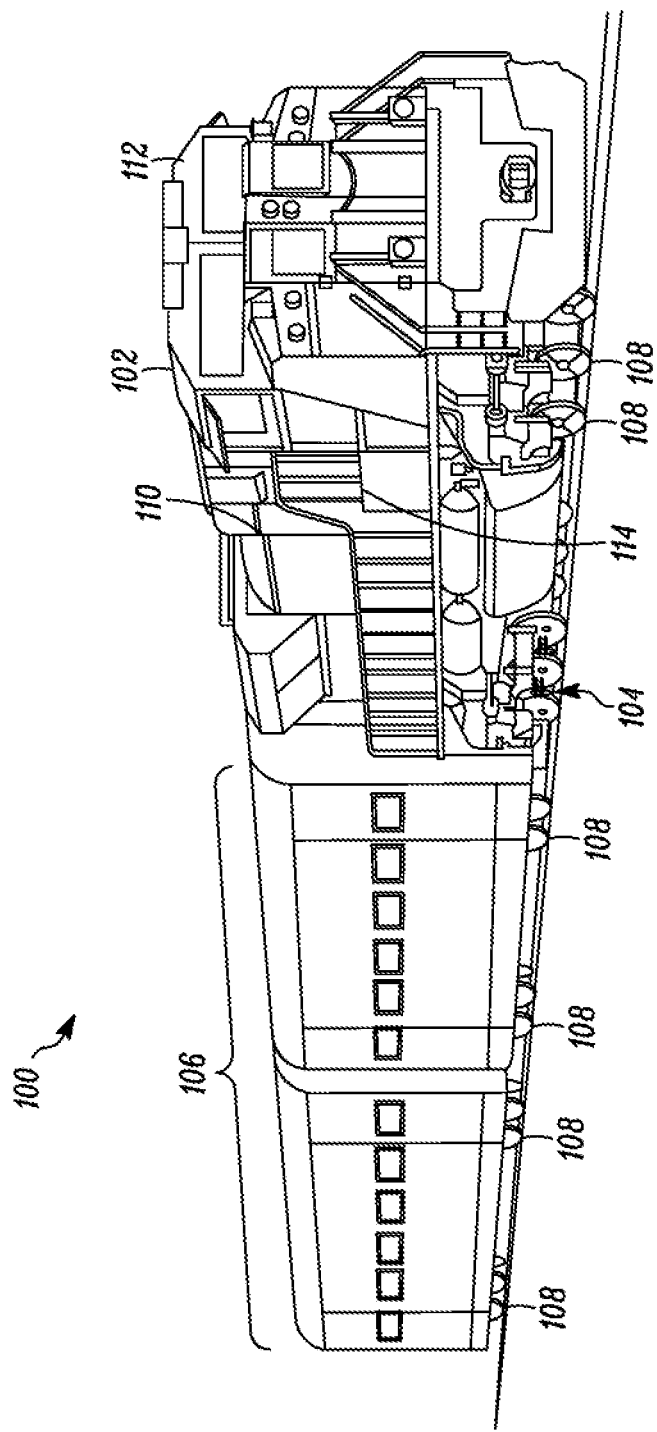
FIG. 1 is a perspective view of an exemplary train, in accordance with the concepts of the present disclosure.

Referring to FIG. 1, an exemplary train 100 is illustrated. The train 100 includes a locomotive 102, chassis 104, and a number of cars 106. The locomotive 102 and the cars 106 have a number of wheels 108. Further, the locomotive 102 includes a body 110, an operator cab 112, and a walking platform 114. The cars 106 are utilized for carrying goods or services, or carrying goods or passengers from one location to another.

The train 100 includes the locomotive 102 having a combustion engine (not shown), specifically a diesel engine, which drives an alternator (not shown). The alternator provides electrical power to traction motors (not shown), which are mounted on the chassis 104 to drive the wheels 108. Further, the locomotive 102 has the operator cab 112 and the walking platform 114 that surrounds the body 110 of the locomotive 102. The train 100 further includes various other components such as, but not limited to, a number of doors and windows. For the purpose of simplicity, the various other components of the train 100 are not labeled in FIG. 1. The train 100 may include more than one locomotive 102 as well, without departing from the scope of the disclosure. The train also includes a spotter control system 206 (see FIG. 2). The spotter control system 206 provides a short distance and low speed electric drive from the existing power in batteries, alternators, traction motors, and so on. A person of ordinary skill in the art will appreciate that the spotter control system 206 relates to existing locomotive equipment on the train 100 and enables an operator to efficiently move the train 100.

Figure 2:
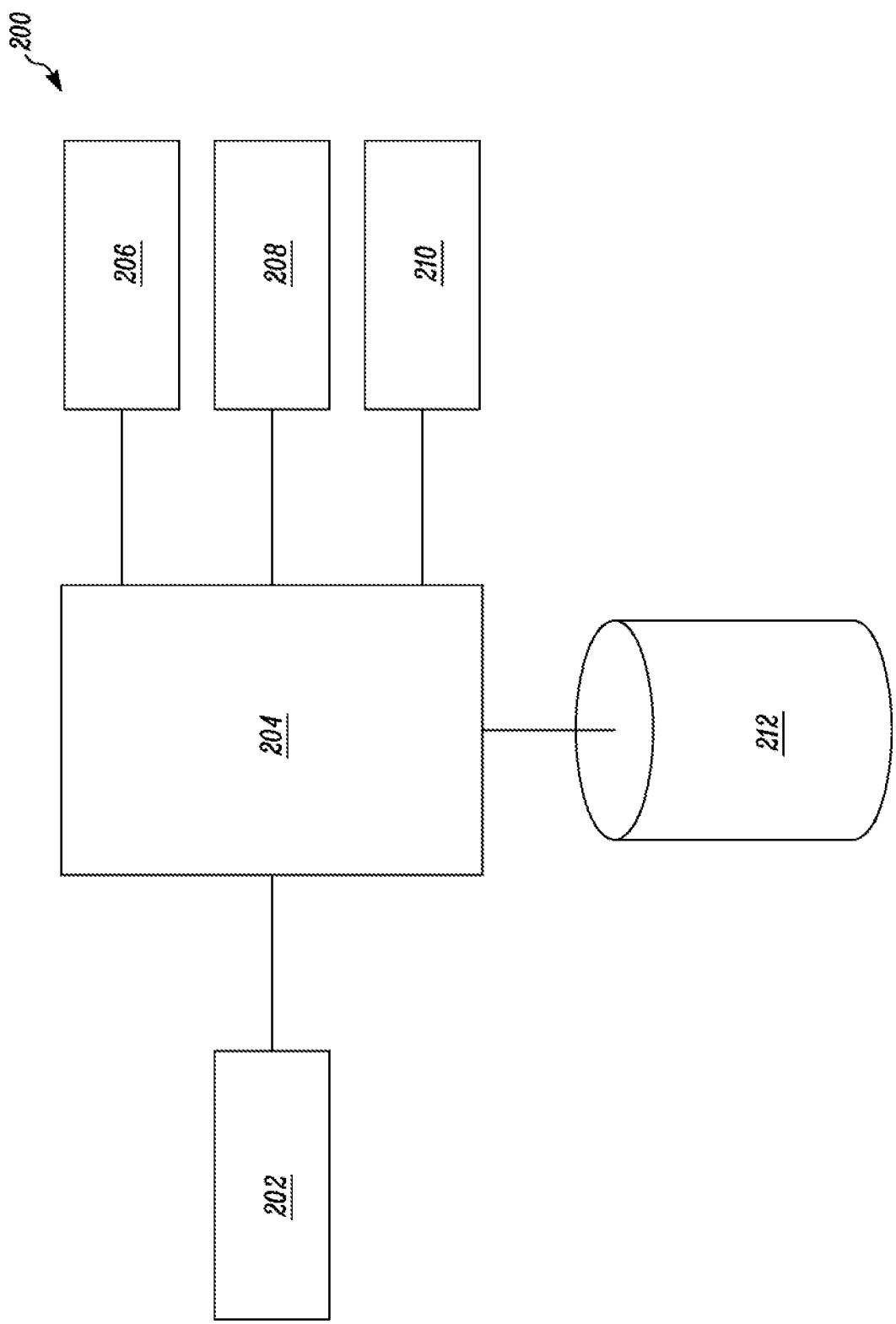
FIG. 2 is a block diagram of a triggering system associated with the train of FIG. 1, in accordance with the concepts of the present disclosure.
Figure 3:
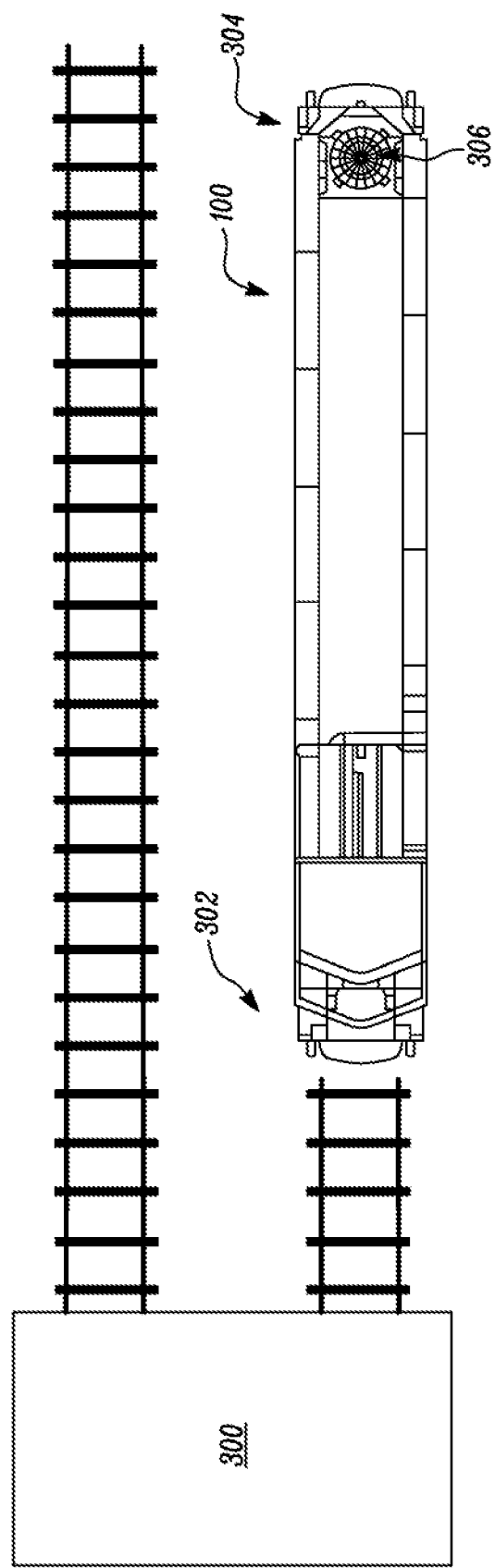
FIG. 3 is a schematic diagram of the train approaching a rail shop, in accordance with the concepts of the present disclosure.

The present disclosure relates to a triggering system 200 associated with the spotter control system 206 for the train 100 that is approaching a rail shop 300 (see FIG. 3). Referring to FIG. 2, the triggering system 200 includes a position detection system 202. The position detection system 202 is configured to generate a position signal indicative of a position of the train 100 relative to the rail shop 300. The position detection system 202 may be a GPS system, an RFID sensor, an optical sensor, and/or a proximity sensor. In one example, the position detection system 202 is provided on the train 100.

Further, the triggering system 200 includes a controller 204 that is coupled to the position detection system 202. The controller 204 is configured to receive the position signal from the position detection system 202. The controller 204 automatically controls an activation of the spotter control system 206 on detection of the train 100 approaching the rail shop 300 and twill be explained in detail later in this section. Referring to FIGS. 2 and 3, the train 100 is shown moving towards the rail shop 300. More particularly, the train 100 is headed in a direction towards the rail shop 300 and is travelling at a given speed.

In this case, the position detection system 202 generates the position signal indicative of a distance between a fixed point on the train 400 to a predetermined location at the rail shop 300. For example, the fixed point on the train 100 may be a location at a start 302 of the train 100, a location at an end 304 of the train 100, a center point of the locomotive of the train, a center point of an exhaust stack 306 of the train 100, or any other similar fixed point on the train 100. Further, the predetermined location at the rail shop 300 may be any suitable predefined location, for example, a door or entrance of the rail shop 300.

The controller 204 also receives signals indicative of the speed of the train 100 and a direction of heading of the train 100. The controller 204 may either receive this data directly from an electronic control module (ECM) or any other sensor module (not shown) of the train 100. Alternatively, the controller 204 may determine the speed and direction of heading based on signals received from a control panel in the operator cab 112. In other embodiments, the controller 204 may indirectly determine the speed and the direction of heading of the train 100 using any other known methods.

Further, in some embodiments, the controller 204 may be coupled to an image capturing device (not shown) provided on the train 100. The image capturing device may be a camera, a camcorder, or any video or image capturing device. The image capturing device is configured to capture an image or video feed of train 100 as the train 100 approaches the rail shop 300. The controller 204 receives the feed captured by the image capturing device and performs image analysis on the video feed to determine if the train 100 is approaching the rail shop 300. The controller 204 may analyze the feed on a frame by frame basis to determine if the train 100 is at a predetermined distance from the rail shop 300. One of ordinary skill in the art will appreciate that known image analysis and comparison techniques may be used to analyze the feed.

After receiving the position signal, and based on the direction of heading and the speed of the train 100, the controller 204 determines if the train 100 is approaching the rail shop 300 when the distance between the train 100 and the rail shop 300 becomes less than the predetermined distance in one example, the controller 204 is coupled to database 212. The database 212 is any known data storage device for storing the predetermined distance. The controller 204 may access and retrieve the predetermined distance from the database 212. Alternatively, the predetermined distance may be input by an operator. While the tram 100 is headed towards the rail shop 300, when the current distance between the train 100 and the rail shop 300 is less than the predetermined distance, the controller 204 automatically triggers the activation of the spotter control system 206.

In some embodiments, the controller 204 is also coupled to the battery or alternate source of power of the train 100. The controller 204 is configured to receive a signal indicative of a state of charge of the battery. In this case, the controller 204 compares the current state of charge of the battery with a predetermined threshold value. The controller 204 may retrieve the predetermined threshold value from the database 212. Further, the controller 204 may then trigger the activation of the spotter control system 206 if the current state of charge of the battery is more than the predetermined threshold value, indicating that the battery is sufficiently charged for the spotter control activation.

The controller 204 is coupled to the engine 208 and the spotter control system 206 on the train 100. The controller 204 triggers the shutdown of the engine 208 and the activation of the spotter control system 206 on detection that the train 100 is approaching the rail shop 300. The controller 204 is configured to time the activation of the spotter control system 206 such that based on the speed and the distance between the train 100 and the door of the rail shop 300, the spotter control system 206 is activated by the time the train 100 reaches the door of the rail shop 300.

The controller 204 is also coupled to a display unit 210. The display unit 210 may be present in the operator cab 112 of the train 100. Alternatively, the display unit 210 may be present a remote location away from the train 100 100. The display unit 210 may include any known output unit such as a screen, a monitor, a touchscreen, a control panel display, and so on. The controller 204 204 is configured to provide the notification of the activation of the spotter control system 206 through the display unit 210.

In some embodiments, the operator may manually activate this triggering system 200 by press of a button or any other suitable control provided within the operator cab 112. Also, in some situations, the operator may be able to manually override the functionality of the triggering system 200. Additionally or optionally, the triggering system 200 may deactivate the spotter control system 206 when the train 100 starts to head away from the rail shop 300.

Based on the requirements of the system, the triggering system 200 related logic may either be present on-board or off-board the train 100. Further, the triggering system 200 may either be an integrated device or may include separate subassemblies. The controller 204 may be a microprocessor or other processor as known in the art. The controller 204 may embody a single microprocessor or multiple microprocessors for receiving signals from components of the system. Numerous commercially available microprocessors may be configured to perform the functions of the controller 204. A person of ordinary skill in the art will appreciate that the controller 204 may additionally include other components and may also pert grin other functions not described herein.

INDUSTRIAL APPLICABILITY

Figure 4:
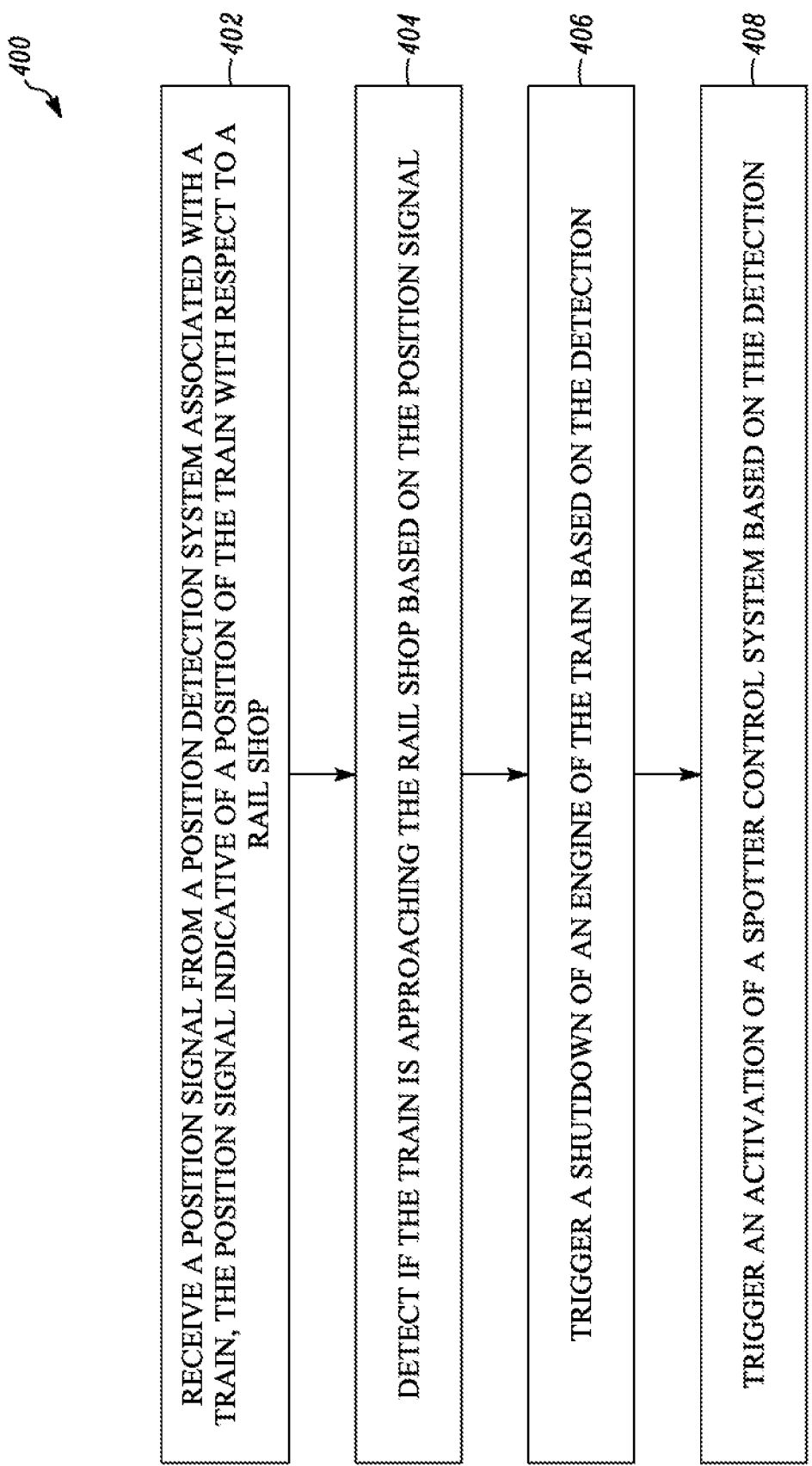
FIG. 4 is a flowchart of a method for triggering a spotter control system associated with the train, in accordance with the concepts of the present disclosure.

The present disclosure relates to the system and method 400 for triggering the spotter control system 206 on the train 100. Referring to FIG. 4, at step 402, the controller 204 receives the position signal from the position detection system 202 associated with the train 100. The position signal is indicative of the position of the train 100 with respect to the rail shop 300. At step 404, the controller 204 detects if the train 100 is approaching the rail shop 300 based on the position signal. At step 406, the controller 204 triggers the shutdown of the engine 208 of the train 100 based on the detection. At step 408, the controller 204 triggers the activation of the spotter control system 206 based on the detection.

The triggering system 200 is a robust and effective system that automatically activates the spotter control system 206 when the train 100 is approaching the rail shop 300. The system does not rely on operator intervention and can ready the train 100 prior to arrival at the rail shop 300. By effectively utilizing the spotter control system 206 on-board the train 100, the triggering system 200 allows maintenance of the train 100 to be quicker and less laborious. Further, the system deactivates the spotter control system 206 when the train 100 begins to head out of the rail shop 300. The system is cost effective and can be easily retro-fitted onto existing trains having the spotter control system 206.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A triggering system for a train having a spotter control system, the triggering system comprising:
   a position detection system configured to:
      generate a position signal indicative of a position of a rail shop relative to the train; and
   a controller configured to:
      receive the position signal from the position detection system;
      detect that the train is approaching the rail shop based on the position signal;
      determine that a current state of charge of a battery of the train satisfies a threshold;
      trigger, based on the detection, a shutdown of an engine of the train; and
      trigger, based on the detection and based on determining that the current state of charge of the battery satisfies the threshold, an activation of the spotter control system, the spotter control system providing electric drive from power of the battery.

2. The triggering system of claim 1, wherein the position detection system includes at least one of a GPS, an RFID sensor, an optical sensor, or a proximity sensor.

3. The triggering system of claim 1, wherein the controller is further configured to:
   receive a signal indicative of the current state of charge of the battery.

4. The triggering system of claim 1, wherein the controller is further configured to:
   receive, from an electronic control module (ECM) of the train or from a control panel in an operator cab of the train, a signal indicative of a speed of the train, and wherein, when detecting that the train is approaching the rail shop, the controller is configured to:
   detect that the train is approaching the rail shop based on the position signal and the speed of the train.

5. The triggering system of claim 1, wherein the controller is further configured to:
   receive, from an electronic control module (ECM) of the train or from a control panel in an operator cab of the train, a signal indicative of a direction of heading of the train, and wherein, when detecting that the train is approaching the rail shop, the controller is configured to:
   detect that the train is approaching the rail shop based on the position signal and the direction of heading of the train.

6. The triggering system of claim 1, wherein, when detecting that the train is approaching the rail shop, the controller is configured to:
   detect, based on the position signal, that the train is approaching the rail shop when a distance between the train and a door or an entrance of the rail shop is less than a predetermined distance.

7. The triggering system of claim 6, wherein the predetermined distance is any one of prestored in the triggering system or input by an operator.

8. The triggering system of claim 1, wherein the controller is coupled to a display unit, and wherein the controller is further configured to:
   provide, via the display unit, a notification of the activation of the spotter control system.

9. The triggering system of claim 1, wherein the controller is further coupled to an image capturing device associated with the train, and wherein the image capturing device is further configured to:
   capture an image feed of the train with respect to the rail shop.

10. The triggering system of claim 1, wherein the controller is further configured to:
    perform an image analysis on an image or video feed of the train with respect to the rail shop, and wherein, when detecting that the train is approaching the rail shop, the controller is configured to:
    detect that the train is approaching the rail shop based on the image analysis.

11. The triggering system of claim 1, wherein the controller is further configured to:
    deactivate the spotter control system when the train starts to head away from the rail shop.

12. The triggering system of claim 1, wherein the controller is located off-board the train.

13. A method for triggering a spotter control system associated with a train, the method comprising:
    receiving, by a controller, a position signal from a position detection system associated with the train, the position signal indicative of a position of the train with respect to a rail shop;
    detecting, by the controller, that the train is approaching the rail shop based on the position signal;
    determining, by the controller, that a current state of charge of a battery of the train satisfies a threshold;
    triggering, by the controller and based on the detection, a shutdown of an engine of the train; and triggering, by the controller, an activation of the spotter control system based on the detection and based on determining that the current state of charge of the battery satisfies the threshold, the spotter control system providing electric drive from power of the battery.

14. The method of claim 13, further comprising:

receiving a signal indicative of the current state of charge of the battery.

15. The method of claim 13, further comprising:

receiving, by the controller and from a control panel in an operator cab of the train, a signal indicative of a speed of the train, wherein detecting that the train is approaching the rail shop comprises:

detecting that the train is approaching the rail shop based on the position signal and the speed of the train.

16. The method of claim 13, further comprising:

receiving, by the controller and from an electronic control module (ECM) of the train, a signal indicative of a direction of heading of the train, wherein detecting that the train is approaching the rail shop comprises:

detecting that the train is approaching the rail shop based on the position signal and the direction of heading of the train.

17. The method of claim 13, further comprising:

providing, by the controller and through a display unit, a notification of the activation of the spotter control system.

18. The method of claim 13, further comprising:

receiving, by the controller and from an image capturing device, an image feed of the train with respect to the rail shop; and performing, by the controller, an image analysis on the image feed, wherein detecting that the train is approaching the rail shop comprises:

detecting, based on the image analysis, that the train is approaching the rail shop.

19. A train comprising:

an engine;

a spotter control system configured to provide electric drive from power of an alternate power source that is different from the engine; and a triggering system comprising:

a controller configured to:

detect that the train is approaching a rail shop;

determine that a current state of charge of the alternate power source satisfies a threshold;

trigger a shutdown of the engine based on the detection; and trigger, based on the detection and based on determining that the current state of charge of the alternate power source satisfies the threshold, an activation of the spotter control system.

20. The train of claim 19, further comprising at least one of a GPS, an RFID sensor, an optical sensor, a proximity sensor to generate a position signal indicative of a position of the train to a door of the rail shop, wherein the detection is based on the position signal.

* * * * *